INVENTOR
ARTHUR L. GOOD

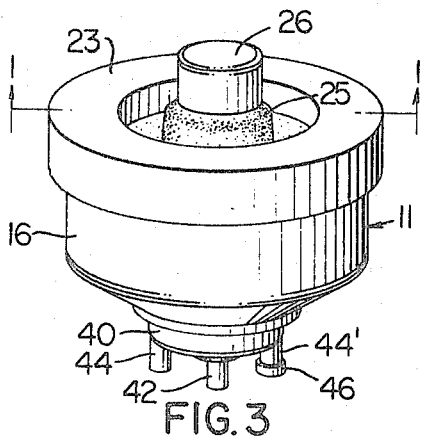
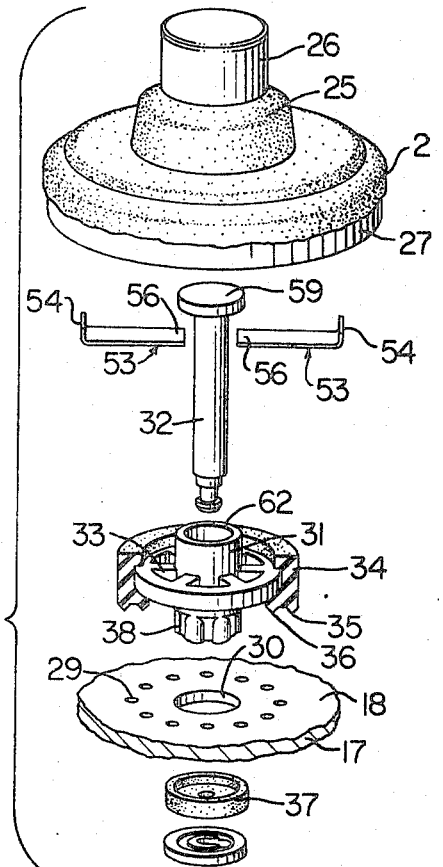
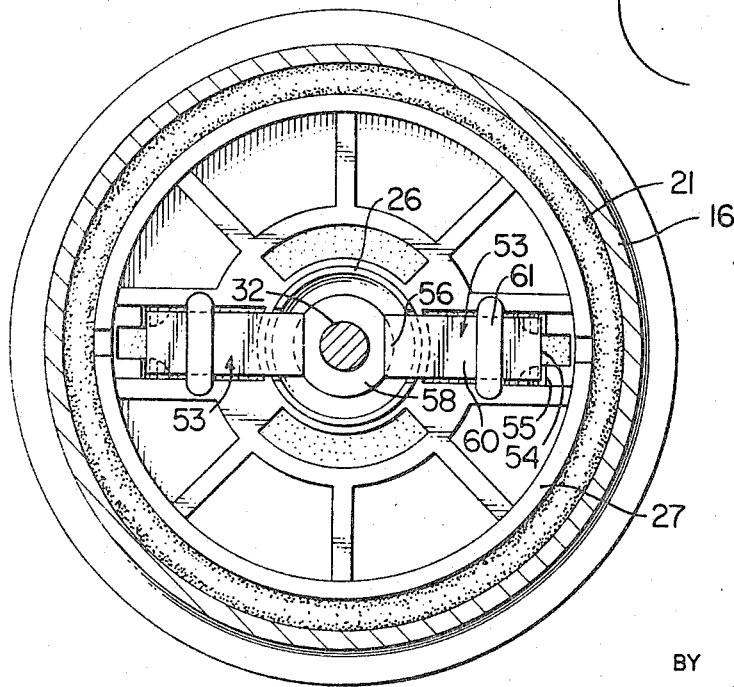

_United States Patent Office_

3,487,846
Patented Jan. 6, 1970

3,487,846
PNEUMATIC CONTROL SYSTEM AND PNEUMAT-
ICALLY OPERATED ACTUATOR THEREFOR OR
THE LIKE
Arthur L. Good, Elkhart, Ind., assignor to Robertshaw
Controls Company, Richmond, Va., a corporation of
Delaware
Filed Mar. 15, 1968, Ser. No. 713,389
Int. Cl. F15b 13/042
U.S. Cl. 137—104                                   20 Claims

ABSTRACT OF THE DISCLOSURE

This disclosure relates to a pneumatically operated actuator having a movable wall means defining a chamber of the actuator, the actuator having a first passage means leading from the chamber thereof to a pneumatic source and another passage means thereof leading from the chamber to a controlled device. The actuator has valve means separate from the movable wall but operated thereby through a lost-motion means so that when the movable wall is in its deactuated position, the movable wall causes the valve means to interconnect the pneumatic source to the chamber while disconnecting the chamber of the actuator from the controlled device and when the movable wall is in its actuated position, the movable wall causes the valve means to close the passage means leading from the source to the actuator chamber while opening the passage means leading from the actuator chamber to the controlled device.

---

This invention relates to a pneumatic control system as well as to an improved pneumatically operated actuator for such a control system or the like.

It is well known that control systems for domestic appliances and the like have included a pneumatically operated arrangement comprising a plurality of pneumatically operated actuators which can be sequentially interconnected to and disconnected from a pneumatic source in a predetermined manner so that each actuator means when actuated will cause a particular function to occur in the apparatus or the like.

This invention provides such a control system wherein a pneumatically operated actuator means can be utilized to control a device and if the actuator means when actuated does not properly control such device, then the actuator means will be automatically deactuated to cause a subsequent actuation thereof in an alternating manner until the controlled device is operated properly by the actuator of this invention.

In particular, the actuator of this invention comprises a housing means carrying a movable wall means that defines a chamber therewith and is adapted to be operatively interconnected to a movable valve means of the actuator, the valve means being so constructed and arranged that the same will close a passage means leading from the actuator chamber to the controlled device while opening the passage means leading from the pneumatic source to the actuator chamber when the movable wall means is in its deactuated position and will cause the valve means to close the passage leading from the source to the actuator chamber while opening the passage means leading from the actuating chamber to the controlled device when the movable wall means is in its actuated position.

Accordingly, it is an object of this invention to provide an improved pneumatic control system having one or more of the novel features set forth above or hereinafter shown or described.

Another object of this invention is to provide an improved pneumatically operated actuator means for such a control system or the like, the actuator means having one or more of the novel features of this invention set forth above or hereinafter shown or described.

Other objects, uses and advantages of this invention are apparent from a reading of this description which proceeds with reference to the accompanying drawings forming a part thereof and wherein:

FIGURE 3 is a top perspective view of the actuator of FIGURE 1 and is in reduced size.

FIGURE 4 is a cross-sectional view taken substantially on line 4—4 of FIGURE 1.

FIGURE 5 is an exploded perspective view of certain of the parts of the actuator of FIGURE 1.

Figure 1:
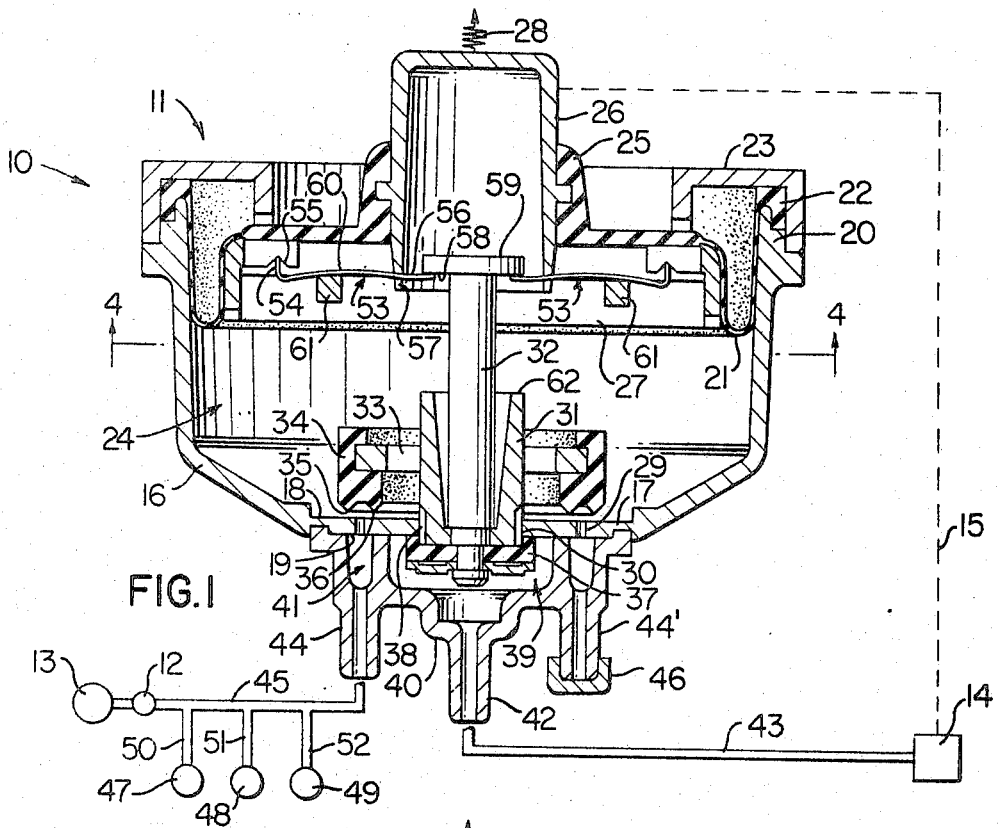
FIGURE 1 is a schematic view illustrating the control system of this invention with the pneumatically operated actuator of this invention being in cross-section, the actuator of FIGURE 1 being taken substantially on line 1—1 of FIGURE 3 and being enlarged therefrom.

While the various features of this invention are hereinafter described and illustrated as being particularly adaptable for use in a control system for causing automatic actuation and deactuation of a pneumatically operated actuator until a controlled device functions properly, it is to be understood that the various features of this invention can be utilized singly or in any combination thereof to provide actuator means for other types of control systems as desired.

Therefore, this invention is not to be limited to only the embodiment illustrated in the drawings, because the drawings are merely utilized to illustrate one of the wide variety of uses of this invention.

Figure 2:
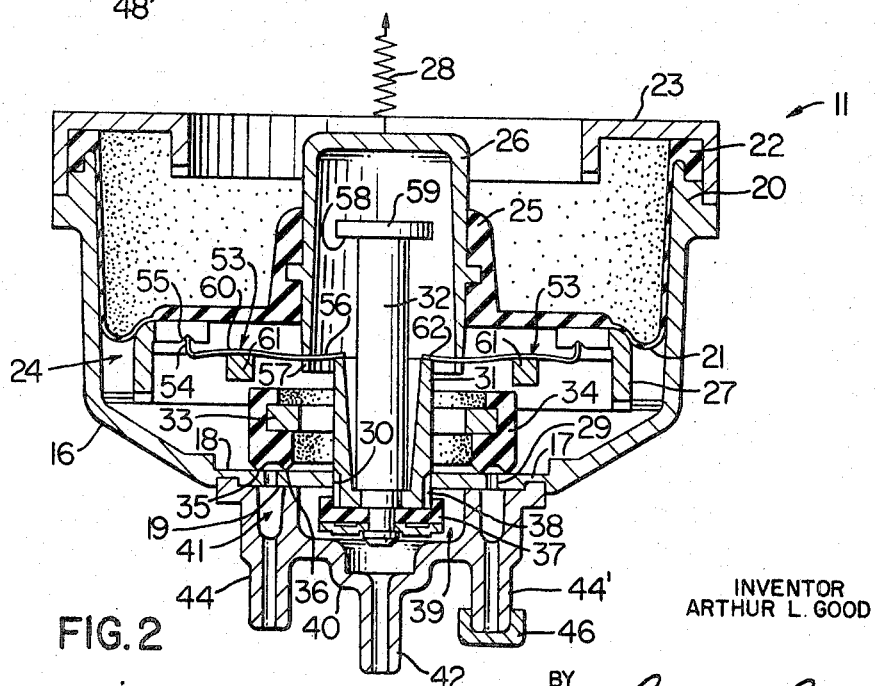
FIGURE 2 is a view similar to FIGURE 1 and illustrates the actuator of this invention in its actuated position.

Referring now to FIGURE 1, the pneumatic control system of this invention is generally indicated by the reference numeral 10 and includes a pneumatically operated actuator of this invention generally indicated by the reference numeral 11 which will be moved from its deactuated condition of FIGURE 1 when an operator or the like sets a selector means 12 to its "on" position and thereby interconnect a pneumatic source 13 to the actuator 11 so that the actuator 11 can move to its actuated condition as illustrated in FIGURE 2 to operate a device 14 through a tieing means 15 to produce a desired function. However, should the actuator 11 when moved to its actuated condition of FIGURE 2 not properly operate the device 14, the device 14 is adapted to cause automatic deactuation of the actuator 11 of this invention back to the position illustrated in FIGURE 1 to be again actuated by the source 13 in an alternating manner until the controlled device 14 is properly controlled by the actuator 11.

The actuator 11 comprises a cup-shaped housing member 16 having a closed flat end wall 17 provided with opposed flat surfaces 18 and 19 and an opposed open end 20 closed by a flexible diaphragm or movable wall means 21 having its outer periphery 22 secured to the open end 20 of the cup-shaped housing member 16 by another housing member 23 secured to the housing member 16 in any suitable manner whereby the diaphragm 21 cooperates with the housing 16 to define a chamber 24 therebetween.

The inner periphery 25 of the flexible diaphragm 21 is interconnected to an actuating post 26 that is interconnected to a diaphragm back-up plate 27 disposed in the chamber 24 of the actuator 11 and being disposed against the under side of the flexible diaphragm 21. A tension spring 28 is interconnected to the actuating post 26 to always tend to move the flexible diaphragm 21 upwardly to its deactuated position as illustrated in FIG- URE 1. The actuating post 26 is interconnected by suitable mechanical linkage means 15 or the like to the controlled device 14 for a purpose hereinafter described..

The end wall 17 of the cup shaped housing 16 is provided with a plurality of circularly arranged passage means 29 interrupting the opposed surfaces 18 and 19 thereof and being concentrically disposed about a central aperture means 30 passing through the end wall means 17 and telescopically receiving a substantially cylindrical member 31 secured to an elongated valve stem 32. The cylindrical member 31 is interconnected by a spider member 33 to a valve member 34 that is disposed in the chamber 24 and has a pair of annular ridges or valve faces 35 and 36 adapted to seat against the surface 18 of the end wall 17 to close the passage means 29 from the chamber 24 when the flexible diaphragm 21 is disposed in its actuated position as illustrated in FIGURE 2 in a manner hereinafter described.

The valve stem 32 carries another valve member 37 adapted to seat against the flat surface 19 of the end wall 17 to seal closed the central aperture 30 thereof when the valve stem 32 is moved to the position illustrated in FIGURE 1 in a manner hereinafter described by the diaphragm 21 being moved to its deactuated position as illustrated in FIGURE 1 in a manner hereinafter described.

The stem member 31 has a series of longitudinal slots or recesses 38 formed in the lower end thereof adjacent the valve member 37 so that when the valve stem 32 is moved to the position illustrated in FIGURE 2, the slots 38 interconnect the chamber 24 to another chamber 39 of the actuator through the now opened central aperture 30 in the end wall 17, the other chamber 39 being defined between the end wall 17 of the housing member 16 and another housing member 40 secured thereto in any suitable manner.

In addition, the housing member 40 cooperates with the end wall 17 of the housing member 16 to define an annular chamber 41 separate from the chamber 39 and being disposed in fluid communication with the circularly arranged passages 29 for a purpose hereinafter described. The housing member 40 has an outwardly extending tubular portion or nipple means 42 that is adapted to fluidly interconnect the chamber 39 with the device 14 by means of flexible conduit means 43 or the like.

While the control device 14 can comprise any desired structure, the embodiment thereof illustrated in the drawings comprises means for normally interconnecting the atmosphere to the conduit 43 and for disconnecting the atmosphere from the conduit 43 only when properly actuated by the plunger 26 of the actuator 11 moving from the deactuated position of FIGURE 1 to the actuated position of FIGURE 2.

One or more other tubular extensions or nipple means 44 can project from the housing 40 so as to fluidly interconnect any desired means to the annular chamber 41. In the embodiment illustrated in FIGURE 1, the left hand nipple 44 is adapted to be interconnected to the pneumatic source 13 by a flexible conduit means 45 when the selector means 12 is disposed in its "on" position thereof while the right hand nipple means 44' is sealed from the atomsphere by a suitable closure cap 46.

The conduit means 45, downstream from the selector means 12, can be respectively interconnected to a plurality of pneumatically operated actuators 47, 48 and 49 by branch conduit means 50, 51, 52.

A pair of leaf-like spring members or fingers 53 are carried by the backup plate 27 of the actuator 11 and respectively has outer bent ends 54 received in suitable recesses 55 in the plate 27 while their inner ends 56 abut against the lower end 57 of the actuating post 26 and extend radially inwardly therefrom so as to be adapted to engage an under surface 58 of an enlarged disc-like member 59 on the upper end of the stem 32 for a purpose hereinafter described. The intermediate portions 60 of the spring members 53 are respectively bowed over abutment means 61 of the backup plate 27 so as to secure the spring members 53 thereto.

The operation of the control system 10 utilizing the actuator 11 of this invention will now be described.

It is assumed that initially the control system 10 is disposed in the "off" condition illustrated in FIGURE 1 and that the pneumatic source 13 is a vacuum source, such as a vacuum pump or the like.

When the operator desires to turn on the control system 10, the operator sets the selector means 12 in its "on" position whereby the vacuum source 13 is not only interconnected to the actuators 47, 48 and 49 to actuate the same, but also the vacuum source 13 is interconnected to the chamber 24 of the actuator 11 to begin to evacuate the same because in the deactuated condition of the actuator 11, the tension spring 28 holds the flexible diaphragm 21 in the up position illustrated in FIGURE 1 so that the spring fingers 53 have their ends 56 bearing against the under surface 58 of the stem disc 59 to hold the valve members 34 and 37 in the position illustrated in FIGURE 1 where the valve member 34 is away from the end surface 18 and the valve member 37 is sealing the central passage means 30 from the chamber 39 and, thus, from the actuator 14.

As the chamber 24 of the actuator 11 is being progressively evacuated by the interconnected source 13, the pressure differential across the diaphragm 21 progressively increases so that when the same increases to a force greater than the force of the tension spring 28 tending to hold the diaphragm 21 in the position illustrated in FIGURE 1, the diaphragm 21 begins to move downwardly from the position illustrated in FIGURE 1 to the position illustrated in FIGURE 2 whereby the spring fingers 53 move away from the stem disc 59. However, the valve stem 32 remains in the position illustrated in FIGURE 1 because of the pressure differential acting across the valve member 37 whereby the chamber 24 remains sealed from the passage means 43 leading to the controlled device 14 which is interconnecting the atmosphere to the conduit 43 and, thus, to the chamber 39.

As the diaphragm 21 is moving downwardly from the position illustrated in FIGURE 1 to the position illustrated in FIGURE 2, it can be seen that the spring fingers 53 have their inner ends 56 subsequently engaged against the upper annular end surface 62 of the stem member 31 as illustrated in FIGURE 2 to move the valve stem 32 downwardly to the position illustrated in FIGURE 2, it can be seen that the spring fingers 53 have their inner ends 56 subsequently engaged against the upper annular end surface 62 of the stem member 31 as illustrated in FIGURE 2 to move the valve stem 32 downwardly to the position illustrated in FIGURE 2 where the valve member 34 now seals the passage means 29 from the chamber 24 to disconnect the vacuum source 13 from the chamber 24 while the valve member 37 is moved to the open position so that the chamber 24 of the actuator 11 is now interconnected to the conduit means 43.

However, as the flexible diaphragm 21 is moving from its deactuated position illustrated in FIGURE 1 to its actuated position illustrated in FIGURE 2, such movement of the actuating post 26, through the tieing means 15, tends to operate the device 14 in such a manner that if the device 14 is properly actuated by the actuated actuator 11, the device 14 will disconnect the atmosphere from the conduit 43 so that the actuator 11 will remain in its actuated condition illustrated in FIGURE 2 until the control system 10 is turned to its "off" condition where the device 14 will again interconnect the atmosphere to the conduit 43 so that the actuator 11 can be deactuated.

If, however, the initial downward movement of the diaphragm 21 from its deactuated position of FIGURE 1 to its actuated condition of FIGURE 2 does not properly operate the control device 14 so that the same will disconnect the atmosphere from the conduit 43, the conduit 43 will remain interconnected to the atmosphere so that when the valve member 37 moves away from the under surface 19 of the end wall 17, the chamber 39 will be interconnected to the chamber 24 and since the atmosphere is being interconnected to the chamber 39 by the non-actuated device 14, such air will now bleed into the chamber 24 to progressively reduce the pressure differential acting across the diaphragm 21 whereby when such pressure differential has decreased to a certain degree, the tension spring 28 will begin to move the flexible diaphragm 21 vertically upwardly from the position illustrated in FIGURE 2 back to the deactuated position illustrated in FIGURE 1.

As the diaphragm 21 is moving vertically upwardly, it can be seen that the inner ends 56 of the spring fingers 53 subsequently come into engagement with the under surface 58 of the stem disc 59 to move the stem 32 vertically upwardly from the position illustrated in FIGURE 2 back to the position illustrated in FIGURE 1 whereby the vacuum source 13 is again interconnected to the chamber 24 and the chamber 39 is sealed from the chamber 24 by the valve member 37 whereby the actuator 11 can again be actuated in the manner previously described to again attempt to actuate the controlled device 14 in a proper manner so that the device 14 will disconnect the atmosphere from the conduit 43.

Therefore, it can be seen that the actuator 11 will be automatically actuated and deactuated in a cycling manner when the selector means 12 is disposed in its "on" position to interconnect the source 13 to the actuator 11 until the actuator 11 properly actuates the controlled device 14 whereby the properly actuated controlled device 14 will disconnect the atmosphere from the conduit 43 so that the actuator 11 will remain in its actuated condition illustrated in FIGURE 2 until subsequently deactuated by the selector means 12 being moved to its "off" position.

Accordingly, it can be seen that this invention not only provides an improved pneumatic control system, but also this invention provides an improved pneumatically operated actuator that will automatically cycle between its actuated and deactuated positions until it has properly actuated its controlled device.

What is claimed is:

1. A pneumatically operated actuator comprising a housing means, a movable wall means carried by said housing means and defining a chamber therewith, said housing means having a first passage means leading to said chamber and a second passage means leading to said chamber, valve means carried by said housing means and when in one position thereof closing said first passage means from said chamber and opening said second passage means to said chamber and when in another position thereof opening said first passage means to said chamber and closing said second passage means from said chamber, and lost-motion means operatively interconnecting said valve means to said movable wall means whereby said wall means moves said valve means to said one position thereof when said wall means moves to one position thereof and moves said valve means to said other position thereof when said wall means moves to another position thereof spaced from said one position thereof.

2. A pneumatically operated actuator as set forth in claim 1 wherein said movable wall means comprises a flexibile diaphragm.

3. A pneumatically operated actuator as set forth in claim 1 wherein said housing means has a wall having said passage means passing therethrough, said valve means comprising two interconnected valve members respectively disposed on opposite sides of said wall and cooperating therewith to open and close said passage means.

4. A pneumatically operated actuator as set forth in claim 3 wherein said interconnected valve members have stem means telescoped in said first passage means of said housing wall.

5. A pneumatically operated actuator as set forth in claim 4 wherein said stem means is interconnected to one of said valve members by a spider-like member, said one valve member being disposed in said chamber.

6. A pneumatically operated actuator as set forth in claim 1 wherein said lost-motion means comprises a pair of spaced shoulder means carried by said valve means, said movable wall means having projection means extending into the space between said shoulder means to engage one of said shoulder means and move said valve means to said one position thereof when said wall means moves to said one position thereof and to engage the other of said shoulder means and move said valve means to said other position thereof when said wall means moves to said other position thereof.

7. A pneumatically operated actuator as set forth in claim 6 wherein said projection means of said movable wall means comprises spring fingers having free ends thereof projecting into said space between said shoulder means.

8. A pneumatically operated actuator as set forth in claim 6 wherein said valve means comprises a pair of valve members interconnected together by a valve stem means, said valve stem means defining said spaced shoulder means.

9. A pneumatically operated actuator as set forth in claim 1 wherein said housing means has a wall having said passage means passing therethrough, and a housing member secured to said housing means and cooperating with said wall to define two separated compartments respectively disposed in fluid communication with said passage means.

10. A pneumatically operated actuator as set forth in claim 9 wherein part of said valve means is disposed in one of said compartments.

11. In combination, a pneumatic source, and a pneumatically operated actuator, said actuator having a movable wall means cooperating therewith to define a chamber in said actuator, said actuator having a first passage means leading from said chamber and having a second passage means leading from said source to said chamber, said actuator having operating means for closing said first passage means while opening said second passage means when said operating means is in one position thereof whereby said source is interconnected to said chamber to move said wall means from one position thereof to another position thereof and for opening said first passage means while closing said second passage means when said operating means is in another position thereof whereby said source is disconnected from said chamber, said actuator having lost-motion means operatively interconnecting said operating means to said movable wall means whereby said wall means moves said operating means to said one position thereof when said wall means moves to said one position thereof and moves said operating means to said other position thereof when said wall means is moved by said source to another position thereof that is spaced from said one position thereof.

12. A combination as set forth in claim 11 wherein said movable wall means comprises a flexible diaphragm.

13. A combination as set forth in claim 11 wherein said actuator has a wall having said passage means passing therethrough, said operating means comprising two interconnected valve members respectively disposed on opposite sides of said wall and cooperating therewith to open and close said passage means.

14. A combination as set forth in claim 13 wherein said interconnected valve members have stem means telescoped in said first passage means of said housing wall.

15. A combination as set forth in claim 14 wherein said stem means is interconnected to one of said valve members by a spider-like member, said one valve member being disposed in said chamber.

16. A combination as set forth in claim 11 wherein said lost-motion means comprises a pair of spaced shoulder means carried by said operating means, said movable wall means having projection means extending into the space between said shoulder means to engage one of said shoulder means and move said operating means to said one position thereof when said wall means moves to said one position thereof and to engage the other of said shoulder means and move said operating means to said other position thereof when said wall means moves to said other position thereof.

17. A combination as set forth in claim 16 wherein said projection means of said movable wall means comprises spring fingers having free ends thereof projecting into said space between said shoulder means.

18. A combination as set forth in claim 16 wherein said operating means comprises a pair of valve members interconnected together by a valve stem means, said valve stem means defining said spaced shoulder means.

19. A combination as set forth in claim 11 wherein said actuator has a wall having said passage means passing therethrough, and a housing member secured to said actuator and cooperating with said wall to define two separated compartments respectively disposed in fluid communication with said passage means.

20. A combination as set forth in claim 19 wherein part of said operating means is disposed in one of said compartments.

References Cited
UNITED STATES PATENTS

| | | | |
|---|---|---|---|
| 3,108,615 | 10/1963 | Cripe | 137—625.66 |
| 3,338,268 | 8/1967 | Houser et al. | 137—625.66 |

HENRY T. KLINKSIEK, Primary Examiner

U.S. Cl. X.R.

137—625.66